(12) United States Patent
Itatsu

(10) Patent No.: US 10,448,318 B2
(45) Date of Patent: Oct. 15, 2019

(54) COMMUNICATION APPARATUS, COMMUNICATION CONTROL METHOD, AND COMMUNICATION SYSTEM

(71) Applicant: ALPINE ELECTRONICS, INC., Shinagawa-ku, Tokyo (JP)

(72) Inventor: Takao Itatsu, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 103 days.

(21) Appl. No.: 15/468,321

(22) Filed: Mar. 24, 2017

(65) Prior Publication Data

US 2017/0332316 A1 Nov. 16, 2017

(30) Foreign Application Priority Data

May 10, 2016 (JP) .................................. 2016-094248

(51) Int. Cl.
| | |
|---|---|
| *H04W 84/06* | (2009.01) |
| *H04W 48/18* | (2009.01) |
| *H04L 12/26* | (2006.01) |
| *H04W 48/16* | (2009.01) |
| *H04W 84/04* | (2009.01) |

(Continued)

(52) U.S. Cl.
CPC ......... *H04W 48/18* (2013.01); *H04L 43/0852* (2013.01); *H04W 48/16* (2013.01); *H04W 84/042* (2013.01); *H04W 84/12* (2013.01); *H04W 88/06* (2013.01)

(58) Field of Classification Search
CPC .... H04W 24/00; H04L 43/05; H04L 43/0852; H04L 43/08; H04B 17/003
See application file for complete search history.

(56) References Cited

U.S. PATENT DOCUMENTS

| | | | | |
|---|---|---|---|---|
| 5,224,205 | A * | 6/1993 | Dinkin ..................... | H04L 29/00 709/226 |
| 7,898,979 | B2 * | 3/2011 | Isozu ....................... | H04L 45/26 370/227 |
| 8,098,709 | B2 | 1/2012 | Wakizaka | |

(Continued)

FOREIGN PATENT DOCUMENTS

| | | |
|---|---|---|
| JP | 2010-278764 | 12/2010 |
| JP | 4760750 | 6/2011 |

(Continued)

*Primary Examiner* — Hassan A Phillips
*Assistant Examiner* — Prenell P Jones
(74) *Attorney, Agent, or Firm* — Brinks Gilson & Lione

(57) ABSTRACT

A communication apparatus includes a communication unit for making communication with a Smartphone by use of one communication channel via Wi-Fi communication, a communication state determination unit for determining whether a communication state of Wi-Fi communication is good, a communication channel search unit for searching a communication channel to be switched via communication with a base station in LTE-LAA communication when it is determined that the communication state is not good, and a communications switching unit for switching the communication channel used for Wi-Fi communication to the searched communication channel, thereby searching a communication channel to be switched by use of other LTE-LAA communication while the Wi-Fi communication with the Smartphone is being kept.

20 Claims, 9 Drawing Sheets

(51) Int. Cl.
    *H04W 84/12*    (2009.01)
    *H04W 88/06*    (2009.01)

(56) References Cited

U.S. PATENT DOCUMENTS

| | | | |
|---|---|---|---|
| 8,433,420 B2 * | 4/2013 | Bange | A61N 1/37252 |
| | | | 128/903 |
| 8,958,456 B2 | 2/2015 | Nagai | |
| 2005/0185658 A1 * | 8/2005 | Kamiwada | H04L 12/2803 |
| | | | 370/401 |
| 2006/0268688 A1 * | 11/2006 | Isozu | H04L 45/26 |
| | | | 370/227 |
| 2015/0036573 A1 * | 2/2015 | Malik | H04W 52/0254 |
| | | | 370/311 |
| 2016/0219024 A1 * | 7/2016 | Verzun | H04L 63/102 |

FOREIGN PATENT DOCUMENTS

| | | |
|---|---|---|
| JP | 2011-146854 | 7/2011 |
| JP | 2013-537770 | 10/2013 |
| JP | 5474255 | 2/2014 |
| JP | 2015-179994 | 10/2015 |
| WO | WO2012/023747 | 2/2012 |
| WO | WO2015/141584 | 9/2015 |

\* cited by examiner

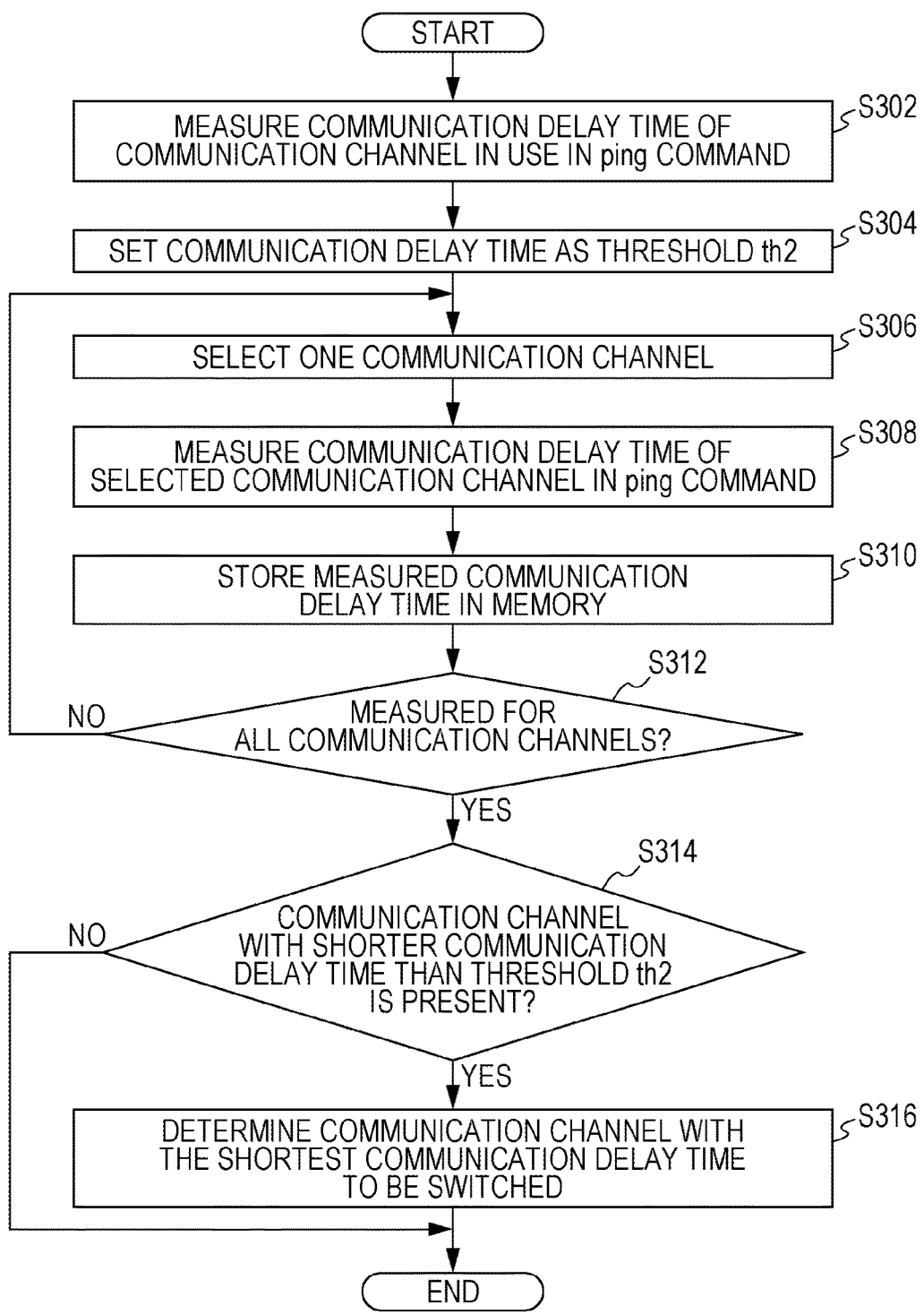

FIG. 4A
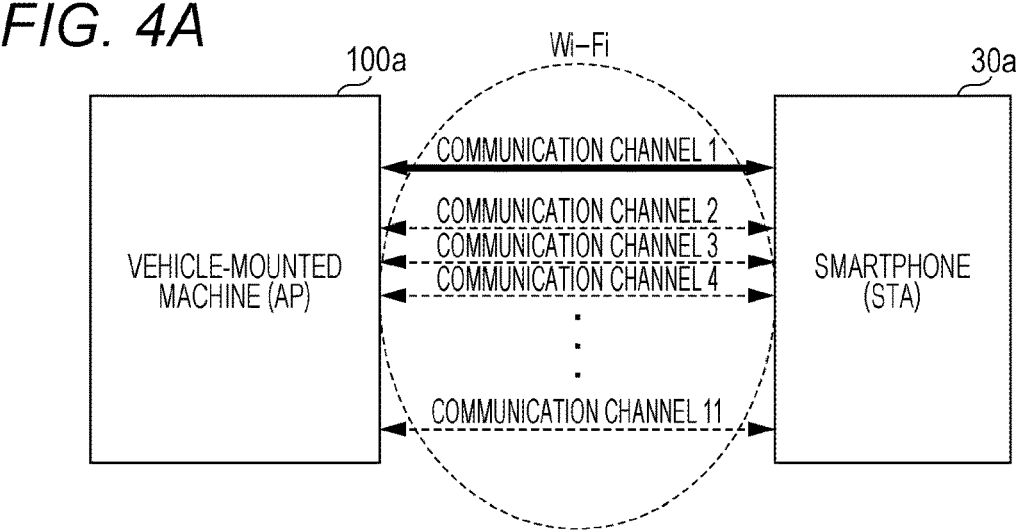
FIG. 4B
| COMMUNICATION CHANNEL | COMMUNICATION DELAY TIME |
|---|---|
| COMMUNICATION CHANNEL 1 | 10ms (THRESHOLD th2) |
| COMMUNICATION CHANNEL 2 | 12ms |
| COMMUNICATION CHANNEL 3 | 8ms |
| COMMUNICATION CHANNEL 4 | 6ms |
| . | . |
| . | . |
| . | . |
| COMMUNICATION CHANNEL 11 | 14ms |
FIG. 4C
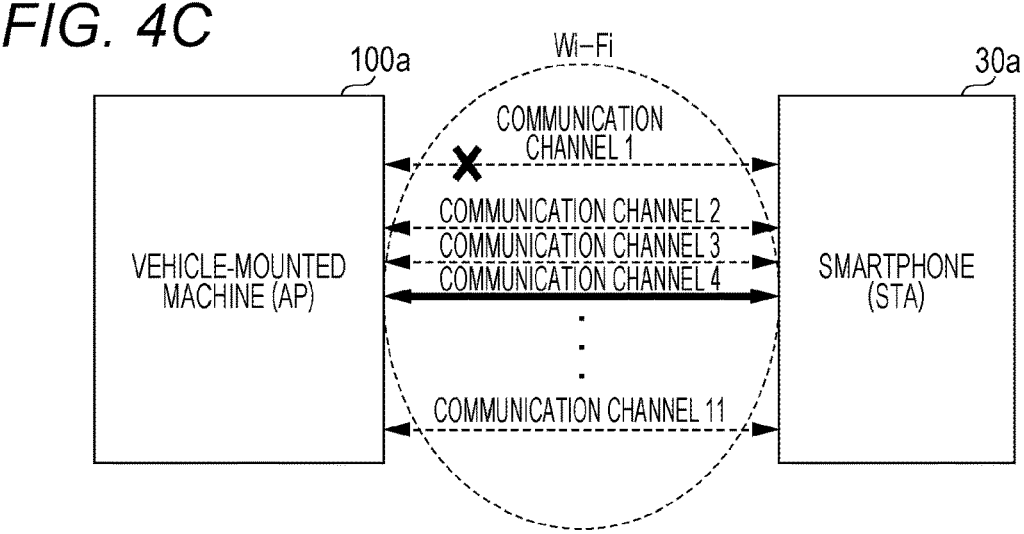

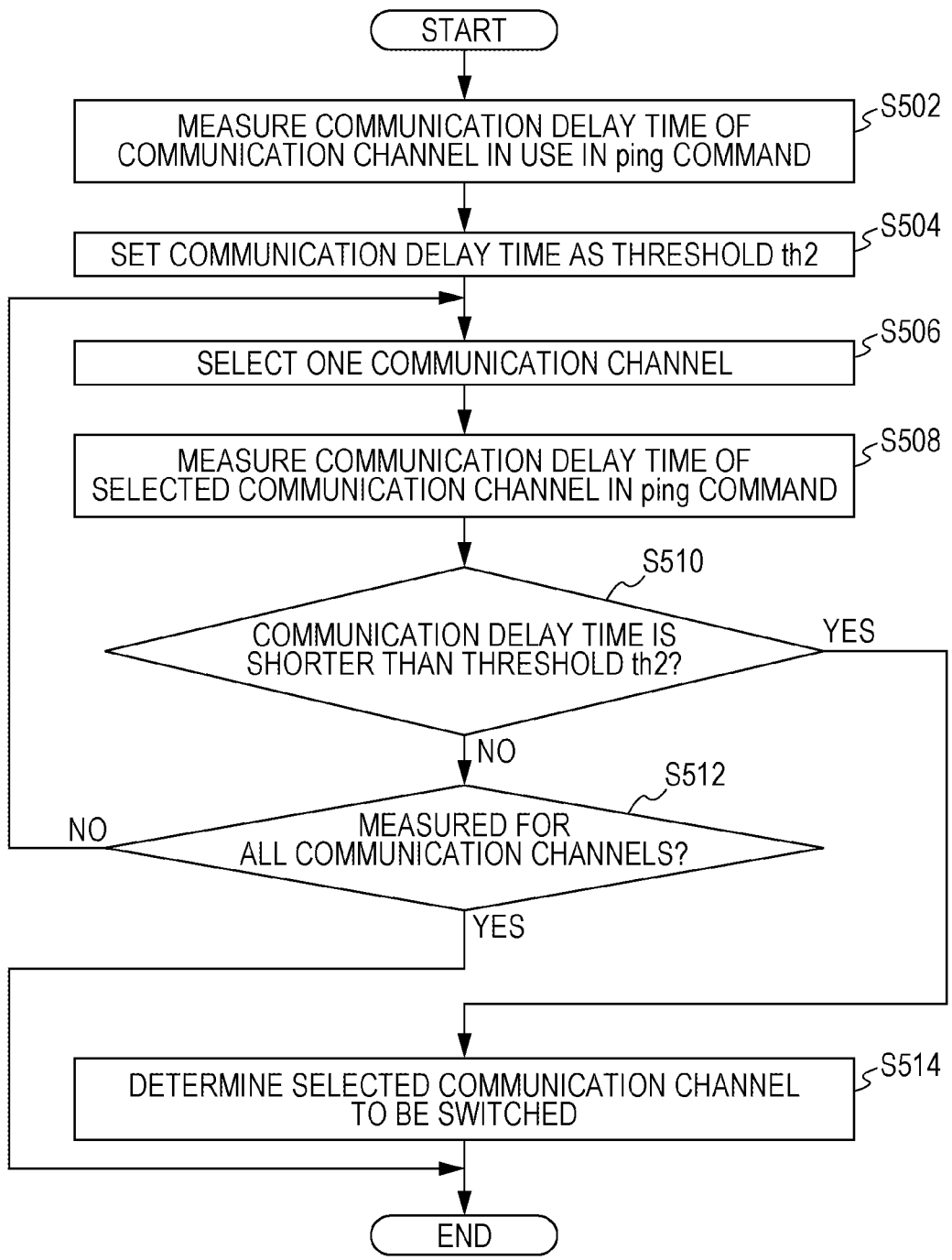

COMMUNICATION APPARATUS, COMMUNICATION CONTROL METHOD, AND COMMUNICATION SYSTEM

RELATED APPLICATION

The present application claims priority to Japanese Patent Application Number 2016-094248, filed May 10, 2016, the entirety of which is hereby incorporated by reference.

BACKGROUND

1. Field of the Invention

The present invention relates to a communication apparatus, a communication control method, and a communication system, and particularly to a communication apparatus capable of making communication by use of any one channel among a plurality of communication channels, a communication control method, and a communication system.

2. Description of the Related Art

Some communication apparatuses such as vehicle-mounted machines can cooperate with a portable terminal by making communication with the portable terminal such as a Smartphone by use of any one communication channel among a plurality of communication channels in a specific communication system (such as Wi-Fi (trademark) communication). The cooperation enables an animation to be streamed from the portable terminal to the vehicle-mounted machine or the portable terminal to be operated from the touch panel of the vehicle-mounted machine.

In the vehicle-mounted machine, the same communication channel as a communication channel currently used to make communication with the portable terminal may be already used by another communication apparatus within a communication area to which the vehicle-mounted machine is to move. In this case, the vehicle-mounted machine commonly uses the same communication channel with another communication apparatus, and the vehicle-mounted machine needs to wait for communication while another communication apparatus is making communication. Thereby, for example, there is caused a problem that an animation streamed from the portable terminal to the vehicle-mounted machine is stopped or an operation response from the vehicle-mounted machine to the portable terminal is delayed. In particular, as more communication apparatuses use the same communication channel, a delay time tends to be longer.

Thus, when a deterioration in performance is caused due to radiowave interference during communication by use of a communication channel while the vehicle-mounted machine is making communication with the portable terminal by use of the communication channel, there is employed a method for searching another communication channel usable for the communication with the portable terminal and switching the communication channel used for the communication with the portable terminal to the other searched communication channel.

For example, JP 2010-278764 A and JP 5474255 B2 disclose a technique for, in a composite wireless apparatus including a WLAN (Wireless LAN) apparatus and a BT apparatus (wireless communication apparatus for Bluetooth (trademark)) for making communication by frequency hopping, sequentially switching a received WLAN channel on power-on, acquiring communication quality information of each WLAN channel, determining a WLAN channel used for WLAN communication with a communication party on the basis of the acquired communication quality information of each WLAN channel, and determining a frequency channel usable by the BT apparatus for frequency hopping.

Further, J P 2010-278764 A and JP 5474255 B2 disclose a technique for, when a WLAN channel used by the WLAN apparatus needs to be changed due to a deterioration in quality of the WLAN channel currently used by the WLAN apparatus, changing the WLAN channel used by the WLAN apparatus according to a predetermined protocol. Further, J P 2010-278764 A discloses a technique for, when the BT apparatus detects a deterioration in communication quality, instructing the WLAN apparatus to change the channel in use or to temporarily stop communication, and thus increasing preferable FH channels usable in the BT apparatus thereby to ensure communication quality.

JP 2013-537770 A discloses a technique for controlling a frequency band to be used such that a plurality of communication modules do not mutually interfere when a plurality of communication modules (such as LTE, wireless LAN, Bluetooth and GPS) are present in a terminal.

JP 2011-146854 A discloses a technique for, in a composite wireless apparatus including a wireless LAN apparatus for making wireless LAN communication by use of a plurality of channels and a weak-radiowave wireless apparatus for making Bluetooth communication by use of another different channel from the channels used for the wireless LAN communication, making communication by use of a frequency band which the weak-radiowave wireless apparatus uses immediately before the wireless LAN apparatus stops communication at the end of the wireless communication of the wireless LAN apparatus.

JP 2015-179994 A discloses a technique for, in a user terminal capable of making communication with a wireless base station by use of a licensed band and a non-licensed band, performing listening (LBT (Listen Before Talk)) before a DL signal is transmitted by use of the non-licensed band, not transmitting a DL signal when an interference with another communication system is detected, and transmitting a DL signal when an interference with another communication system is not detected. In particular, JP 2015-179994 A discloses a technique for reporting information on a LBT result to the wireless base station by use of the licensed band even when an interference of the LBT result is detected (transmission is disabled) and UL transmission using the non-licensed band is stopped. Thereby, the wireless base station can accurately grasp a cause by which the UL transmission is not performed from the user terminal which instructs to perform the UL transmission.

Further, JP 4760750 B2 discloses a technique in which, in a wireless apparatus including a first wireless communication unit for making wireless communication with an external communication device while changing a plurality of channels indicated in a hopping table per predetermined time, and a second wireless communication unit for making wireless communication in a different communication system in the same frequency band as the first wireless communication unit, the second wireless communication unit measures the respective electric field intensities of the channels and the first wireless communication unit stops using a channel whose measured field effect intensity is higher than a predetermined value and makes wireless communication with an external communication device in a time slot configured of only data slots for transferring data. Thereby, the first wireless communication unit can continuously transmit data, prevent a delay in communication as much as possible, keep a preferable communication state, and keep the preferable communication state while avoiding an interference.

SUMMARY

As described above, however, with the method for, when a deterioration in performance is caused due to radiowave interference during communication with the portable terminal by use of one communication channel, searching another communication channel usable for the communication with the portable terminal and switching the communication channel used for the communication with the portable terminal to the searched communication channel, the communication with the portable terminal made so far needs to be temporarily stopped while another communication channel usable for the communication with the portable terminal is being searched. Thus, there is a problem that while another communication channel to be switched is being searched, communication with the portable terminal cannot be made, an animation streamed from the portable terminal to the vehicle-mounted machine is stopped, and an operation response from the vehicle-mounted machine to the portable terminal is delayed.

The present invention has been made in order to solve the problem, and is directed for enabling a communication channel to be switched to be searched without interrupting communication when a deterioration in performance is caused due to radiowave interference during the communication using another communication channel.

In order to solve the above problem, a communication apparatus according to the present disclosure is configured to, when making communication with a second communication apparatus by use of any one communication channel among a plurality of communication channels in a first communication system, determine a communication state in the communication with the second communication apparatus. When it is determined that the communication state in the communication with the second communication apparatus is not good, a communication channel to be switched, which is usable for the communication with the second communication apparatus, is searched via communication with a base station in a second communication system, and the communication channel used for the communication with the second communication apparatus is switched from the communication channel to the searched communication channel to be switched.

According to the embodiment having the above configuration, when a communication performance is deteriorated due to radiowave interference with another communication during the communication with the second communication apparatus, a communication channel to be switched is searched via the base station in a different communication system (the second communication system) from the communication system (the first communication system) used for the communication with the second communication apparatus. That is, a communication channel to be switched can be searched while the communication with the second communication apparatus is being kept. Thus, according to the present disclosure, it is possible to search a communication channel to be switched without interrupting communication when a deterioration in performance is caused due to radiowave interference during the communication by use of another communication channel.

BRIEF DESCRIPTION OF THE DRAWINGS

FIG. 3 is a flowchart illustrating an exemplary search processing by a communication channel search unit;

FIGS. 4A, 4B, and 4C are diagrams illustrating an exemplary communication channel switching operation by the vehicle-mounted machine according to the first embodiment of the present invention;

FIG. 5 is a flowchart illustrating a variant of the search processing by the communication channel search unit;

DETAILED DESCRIPTION OF THE PREFERRED EMBODIMENTS

First Embodiment

A first embodiment of the present invention will be described below with reference to the drawings.

[Exemplary Functional Configuration of Vehicle-Mounted Machine 100a]

Figure 1:
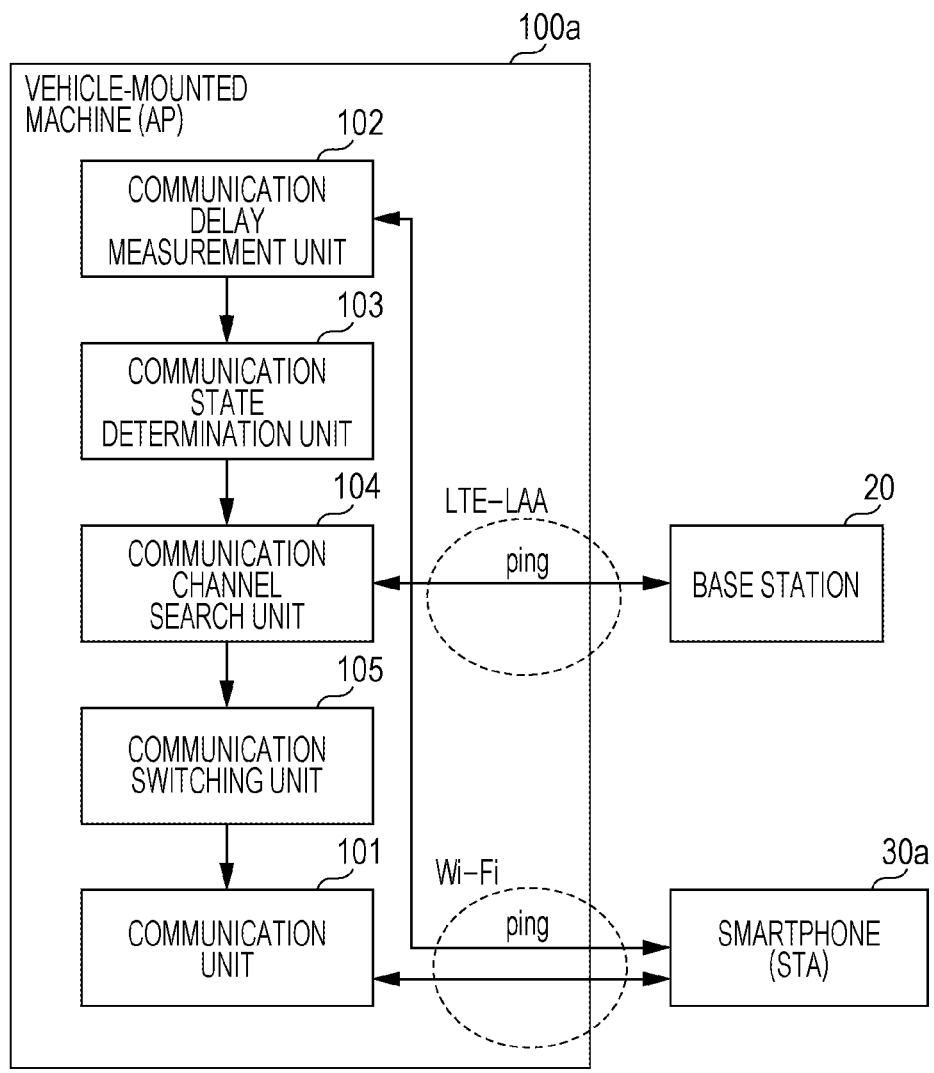
FIG. 1 is a block diagram illustrating an exemplary functional configuration of a vehicle-mounted machine according to a first embodiment of the present invention.

FIG. 1 is a block diagram illustrating an exemplary functional configuration of a vehicle-mounted machine 100a according to the first embodiment of the present invention.

FIG. 1 illustrates a communication system 10a configured of the vehicle-mounted machine 100a (first communication apparatus), a Smartphone 30a (second communication apparatus), and a base station 20. The vehicle-mounted machine 100a is a communication apparatus mounted on a vehicle such as automobile. The vehicle-mounted machine 100a has a wireless communication function via Wi-Fi communication (exemplary first communication system) and a wireless communication function via LTE-LAA communication (exemplary second communication system). The vehicle-mounted machine 100a functions as access point (which will be denoted as "AP" below) for Wi-Fi communication. Thereby, when the Smartphone 30a is present in a communication area of AP of the vehicle-mounted machine 100a, the vehicle-mounted machine 100a can make wireless communication with the Smartphone 30a via Wi-Fi communication by use of any one communication channel among a plurality of communication channels.

The Smartphone 30a is a user (passenger of the vehicle)-owned portable terminal. The Smartphone 30a has a wireless communication function via Wi-Fi communication. The Smartphone 30a further functions as station (which will be denoted as "STA" below) via Wi-Fi communication. Thereby, when being present within the communication area of the vehicle-mounted machine 100a (AP), the Smartphone 30a can make wireless communication with the vehicle-mounted machine 100a via Wi-Fi communication.

As illustrated in FIG. 1, the vehicle-mounted machine 100a according to the present embodiment includes its components such as communication unit 101, communication delay measurement unit 102, communication state determination unit 103, communication channel search unit 104 and communication switching unit 105.

The function blocks 101 to 105 may be configured in any of hardware, DSP (Digital Signal Processor), and software. For example, when configured in software, each of the function blocks 101 to 105 is actually configured of a CPU, a RAM, a ROM and the like in a computer, and is realized by executing a program stored in a recording medium such as RAM, ROM, hard disc, or semiconductor memory.

The communication unit 101 makes wireless communication with the Smartphone 30a via Wi-Fi communication by use of any one communication channel among a plurality of communication channels. The wireless communication made with the Smartphone 30a may be to stream an animation from the Smartphone 30a or to operate the Smartphone 30a via a touch panel (not illustrated) of the vehicle-mounted machine 100a, for example. The wireless communication is not limited thereto.

The communication delay measurement unit 102 transmits a ping command to the Smartphone 30a by use of one communication channel used by the communication unit 101 thereby to measure a communication delay time (which indicates a time after it issues the ping command until it receives a response thereto according to the present embodiment) in the communication with the Smartphone 30a.

The communication state determination unit 103 determines whether a communication state in the communication between the communication unit 101 and the Smartphone 30a is good. According to the present embodiment, when a communication delay time measured by the communication delay measurement unit 102 exceeds a predetermined threshold th, the communication state determination unit 103 determines that the communication state in the communication between the communication unit 101 and the Smartphone 30a is not good. In contrast, when the communication delay time measured by the communication delay measurement unit 102 does not exceed the predetermined threshold th, the communication state determination unit 103 determines that the communication state in the communication between the communication unit 101 and the Smartphone 30a is good. An appropriate value for the predetermined threshold th is previously stored in a memory or the like.

When the communication state determination unit 103 determines that the communication state in the communication with the Smartphone 30a is not good, the communication channel search unit 104 searches a communication channel to be switched, which is usable for the communication with the Smartphone 30a, via communication with the base station 20 in LTE-LAA communication.

By way of example, the communication channel search unit 104 transmits a ping command to the base station 20 via the communication with the base station 20 in LTE-LAA communication thereby to measure a communication delay time of one communication channel in use between the communication unit 101 and the Smartphone 30a, and assumes the measured communication delay time as threshold th2. Further, the communication channel search unit 104 transmits a ping command to the base station 20 via the communication with the base station 20 in LTE-LAA communication thereby to measure a communication delay time of each of a plurality of communication channels (except the communication channel in current use). The communication channel search unit 104 determines a communication channel for which the measured communication delay time is shorter than the threshold th2 and the measured communication delay time is the shortest among the communication channels as a communication channel to be switched.

As a variant, the communication channel search unit 104 transmits a ping command to the base station 20 via the communication with the base station 20 in LTE-LAA communication thereby to measure a communication delay time of the communication channel in use between the communication unit 101 and the Smartphone 30a, and assumes the measured communication delay time as threshold th2. Further, the communication channel search unit 104 transmits a ping command to the base station 20 via the communication with the base station 20 in LTE-LAA communication thereby to measure a communication delay time of each of the communication channels (except the communication channel in current use). Then, when a communication channel for which the measured communication delay time is shorter than the threshold th2 is first found among the communication channels, the communication channel search unit 104 determines the communication channel as a communication channel to be switched.

In the above processing, the communication delay time of one communication channel in current use is set as the threshold th2 since at least another communication channel, which is more preferable in communication state than the communication channel in current use, can be determined as a communication channel to be switched. Furthermore, the delay time of one communication channel in current use is measured in LTE-LAA communication since the condition for the communication system is adjusted for measuring the communication delay time of another communication channel, thereby enhancing a comparison accuracy.

When the communication state determination unit 103 determines that the communication state in the communication with the Smartphone 30a is not good, the communication switching unit 105 switches the communication channel used for the communication between the communication unit 101 and the Smartphone 30a from the communication channel in current use to the communication channel to be switched, which is searched by the communication channel search unit 104. Subsequently, the communication channel to be switched is used for the communication between the communication unit 101 and the Smartphone 30a.

[Exemplary Processing by Vehicle-Mounted Machine 100a]

Figure 2:
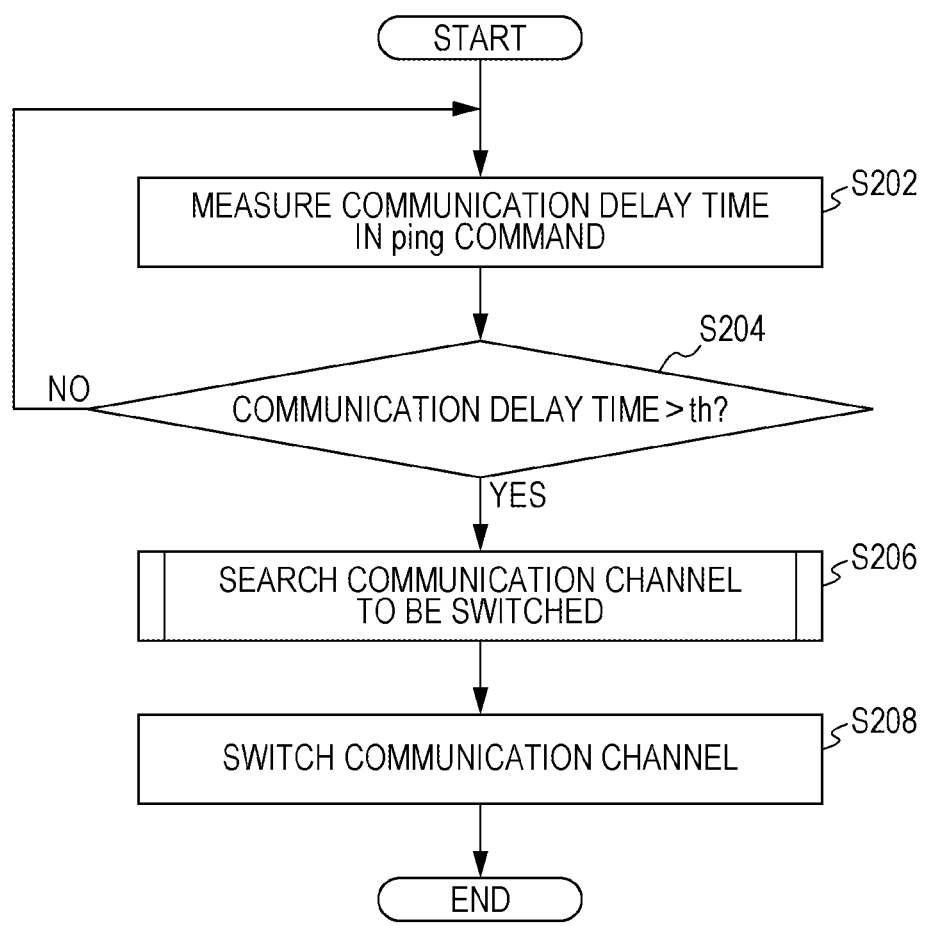
FIG. 2 is a flowchart illustrating exemplary processing by the vehicle-mounted machine according to the first embodiment of the present invention.

FIG. 2 is a flowchart illustrating exemplary processing by the vehicle-mounted machine 100a according to the first embodiment of the present invention. The processing illustrated in FIG. 2 is repeatedly performed while the vehicle-mounted machine 100a is making Wi-Fi communication between the communication unit 101 and the Smartphone 30a.

At first, the communication delay measurement unit 102 transmits a ping command to the Smartphone 30a thereby to measure a communication delay time in Wi-Fi communication with the Smartphone 30a (step S202). Then, the communication state determination unit 103 determines whether the communication delay time measured in step S202 exceeds the predetermined threshold th (step S204).

When the communication state determination unit 103 determines that the communication delay time does not exceed the predetermined threshold th (step S204: No), the vehicle-mounted machine 100a performs the processing in and subsequent to step S202 again.

On the other hand, when the communication state determination unit 103 determines that the communication delay time exceeds the predetermined threshold th (step S204: Yes), the communication channel search unit 104 searches a communication channel to be switched, which is usable for the communication with the Smartphone 30a, via the communication with the base station 20 in LTE-LAA communication (step S206). Step S206 will be described in detail with reference to FIG. 3.

The communication switching unit 105 then switches the communication channel used for the communication between the communication unit 101 and the Smartphone 30a from the communication channel in current use to the communication channel to be switched, which is searched in step S206 (step S208). The vehicle-mounted machine 100a then terminates the processing illustrated in FIG. 2.

[Exemplary Search Processing by Communication Channel Search Unit 104]

FIG. 3 is a flowchart illustrating an exemplary search processing by the communication channel search unit 104. Specifically, FIG. 3 illustrates the processing of searching a communication channel to be switched by the communication channel search unit 104 (step S206) in the flowchart illustrated in FIG. 2 in more detail by way of example.

At first, the communication channel search unit 104 transmits a ping command to the base station 20 via the communication with the base station 20 in LTE-LAA communication thereby to measure a communication delay time of the communication channel in current use between the communication unit 101 and the Smartphone 30a (step S302). The communication channel search unit 104 then sets the communication delay time measured in step S302 as threshold th2 (step S304).

Then, the communication channel search unit 104 selects one of the communication channels (except the communication channel in current use) (step S306). The communication channel search unit 104 transmits a ping command to the base station 20 via the communication with the base station 20 in LTE-LAA communication thereby to measure a communication delay time of the communication channel selected in step S306 (step S308). The communication channel search unit 104 then stores the communication delay time measured in step S308 in the memory provided in the vehicle-mounted machine 100a (step S310).

Thereafter, the communication channel search unit 104 determines whether the communication delay time has been measured for all the communication channels (step S312). When the communication channel search unit 104 determines that the communication delay time has not been measured for all the communication channels (step S312: No), the communication channel search unit 104 performs the processing in and subsequent to step S306 again.

On the other hand, when the communication channel search unit 104 determines that the communication delay time has been measured for all the communication channels (step S312: Yes), the communication channel search unit 104 determines whether a communication channel for which the measured communication delay time is shorter than the threshold th2 is present among the communication channels (step S314).

When the communication channel search unit 104 determines that a communication channel for which the measured communication delay time is shorter than the threshold th2 is not present (step S314: No), the communication channel search unit 104 terminates the processing illustrated in FIG. 3. The termination of the processing indicates that a more preferable communication channel in terms of the communication state than the communication channel in current use is not present, and thus the vehicle-mounted machine 100a does not switch the communication channel used for the communication with the Smartphone 30a.

On the other hand, when the communication channel search unit 104 determines that a communication channel for which the measured communication delay time is shorter than the threshold th2 is present (step S314: Yes), the communication channel search unit 104 determines a communication channel for which the measured communication delay time is the shortest among the communication channels for which the measured communication delay time is shorter than the threshold th2 as a communication channel to be switched (step S316). The communication channel search unit 104 then terminates the processing illustrated in FIG. 3.

[Exemplary Switching Operation by Vehicle-Mounted Machine 100a]

FIGS. 4A to 4C are diagrams illustrating an exemplary communication channel switching operation by the vehicle-mounted machine 100a according to the first embodiment of the present invention.

FIG. 4A illustrates a communication channel use state before a communication channel switching operation by the vehicle-mounted machine 100a is performed. In the example illustrated in FIG. 4A, a communication channel 1 arbitrarily selected by the communication unit 101 among a plurality of communication channels 1 to 11 is used in Wi-Fi communication between the vehicle-mounted machine 100a (AP) and the Smartphone 30a (STA).

FIG. 4B illustrates the communication delay times of the respective communication channels 1 to 11 measured by the communication channel search unit 104 by transmitting a ping command to the base station 20 in LTE-LAA communication when the communication delay time exceeds the predetermined threshold th in the Wi-Fi communication between the communication unit 101 and the Smartphone 30a by use of the communication channel 1. In this way, when the communication delay times of the communication channels 1 to 11 are measured, the communication channel search unit 104 first sets the communication delay time of the communication channel 1 currently used for the communication between the communication unit 101 and the Smartphone 30a ("10 ms" in the example of FIG. 4B) as threshold th2 used for comparison with the communication delay times of the other communication channels 2 to 11. The communication channel search unit 104 then determines a communication channel for which the communication delay time is shorter than the threshold th2 (the communication delay time of the communication channel 1) and the communication delay time is the shortest among the communication channels 2 to 11 as a communication channel to be switched. For example, in the example illustrated in FIG. 4B, the communication channel search unit 104 determines the communication channel 4 (communication delay time="6 ms") meeting the condition as a communication channels to be switched.

FIG. 4C illustrates a communication channel use state after the communication channel switching operation is performed by the vehicle-mounted machine 100a. As described in FIG. 4B, when the communication channel search unit 104 determines the communication channel 4 as a communication channel to be switched, the communication channel used for the communication between the communication unit 101 and the Smartphone 30a is switched by the communication switching unit 105 from the communication channel 1 to the communication channel 4 as illustrated in FIG. 4C. Thereafter, the communication between the communication unit 101 in the vehicle-mounted machine 100a and the Smartphone 30a is made by use of the communication channel 4 having the shortest communication delay time, thereby improving the communication state.

[Variant of Search Processing by Communication Channel Search Unit 104]

FIG. 5 is a flowchart illustrating a variant of the search processing by the communication channel search unit 104. Specifically, FIG. 5 illustrates a variant of the detailed processing of searching a communication channel to be switched by the communication channel search unit 104 (step S206) in the flowchart illustrated in FIG. 2.

At first, the communication channel search unit 104 transmits a ping command to the base station 20 via the communication with the base station 20 in LTE-LAA communication thereby to measure a communication delay time of the communication channel in current use between the communication unit 101 and the Smartphone 30a (step S502). The communication channel search unit 104 then sets the communication delay time measured in step S502 as threshold th2 (step S504).

The communication channel search unit 104 then selects one of the communication channels (except the communication channel in current use) (step S506). The communication channel search unit 104 further transmits a ping command to the base station 20 via the communication with the base station 20 in LTE-LAA communication thereby to measure a communication delay time of the communication channel selected in step S506 (step S508).

The communication channel search unit 104 then determines whether the communication delay time measured in step S508 is shorter than the threshold th2 (step S510). In step S510, when the communication channel search unit 104 determines that the communication delay time measured in step S508 is not shorter than the threshold th2 (step S510: No), the communication channel search unit 104 determines whether the communication delay time has been measured for all the communication channels (step S512).

When the communication channel search unit 104 determines that the communication delay time has not been measured for all the communication channels (step S512: No), the communication channel search unit 104 performs the processing in and subsequent to step S506 again. On the other hand, when the communication channel search unit 104 determines that the communication delay time has been measured for all the communication channels (step S512: Yes), the communication channel search unit 104 terminates the processing illustrated in FIG. 5. The termination of the processing indicates that a more preferable communication channel in communication state than the communication channel in current use is not present, and thus the vehicle-mounted machine 100a does not switch the communication channel used for the communication with the Smartphone 30a.

In step S510, when the communication channel search unit 104 determines that the communication delay time measured in step S508 is shorter than the threshold th2 (step S510: Yes), the communication channel search unit 104 determines the communication channel selected in step S506 as a communication channel to be switched (step S514). The communication channel search unit 104 then terminates the processing illustrated in FIG. 5.

With the processing illustrated in FIG. 5, even when the communication delay time is not measured for all the communication channels, when a communication channel for which the communication delay time is shorter than the threshold th2 is detected, the communication channel can be determined as a communication channel to be switched. Therefore, a time for searching a communication channel to be switched can be further shortened than in the processing illustrated in FIG. 3. That is, a communication channel can be more rapidly switched. The processing illustrated in FIG. 3 is more beneficial than the processing illustrated in FIG. 5 since a communication channel with a shorter communication delay time can be searched.

As described above, according to the first embodiment of the present invention, while the vehicle-mounted machine 100a is making communication with the Smartphone 30a, when the communication performance is deteriorated due to radiowave interference with another communication during the communication and the communication delay time exceeds the threshold th, a communication channel to be switched is searched via the base station 20 in different LTE-LAA communication from Wi-Fi communication used for the communication with the Smartphone 30a. That is, a communication channel to be switched can be searched while the Wi-Fi communication between the vehicle-mounted machine 100a and the Smartphone 30a is being kept. Therefore, according to the first embodiment of the present invention, when a deterioration in performance is caused due to radiowave interference via communication by use of one communication channel, another communication channel to be switched can be searched without interrupting the communication.

In particular, according to the first embodiment of the present invention, a ping command for measuring a time when data goes back and forth between machines is used to measure a communication delay time in the communication with the Smartphone 30a, and the communication state in the communication with the Smartphone 30a is determined on the basis of the communication delay time. Thus, an effect on the communication between the communication unit 101 and the Smartphone 30a can be minimized in determining the communication state in the communication with the smartphone 30a.

Second Embodiment

A second embodiment of the present invention will be described below with reference to FIG. 6 and FIG. 7. In the following description, only the differences from the first embodiment will be described, and other points are similar to those in the first embodiment and thus the description thereof will be omitted.

[Exemplary Functional Configuration of Vehicle-Mounted Machine 100b]

Figure 6:
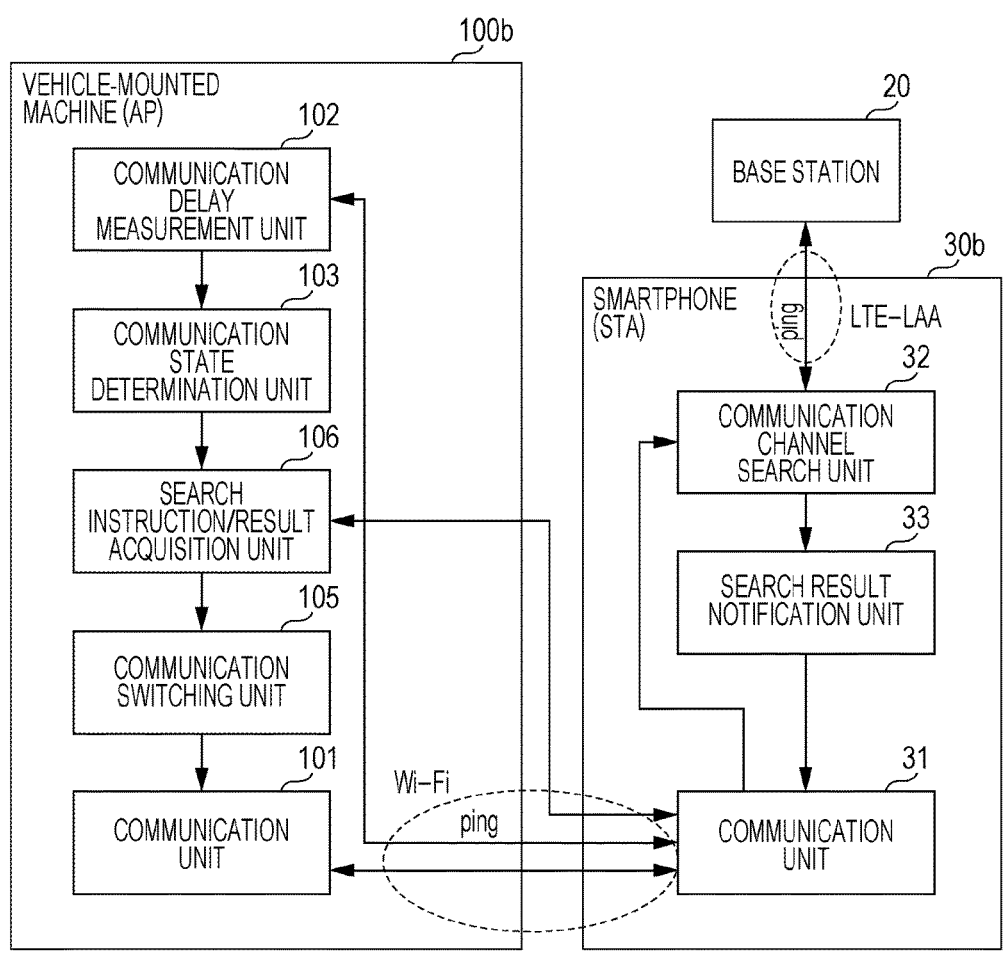
FIG. 6 is a block diagram illustrating exemplary functional configurations of a vehicle-mounted machine and a Smartphone according to a second embodiment of the present invention.

FIG. 6 is a block diagram illustrating exemplary functional configurations of a vehicle-mounted machine 100b and a Smartphone 30b according to the second embodiment of the present invention. FIG. 6 illustrates a communication system 10b configured of the vehicle-mounted machine 100b (first communication apparatus), the Smartphone 30b (second communication apparatus), and the base station 20. The vehicle-mounted machine 100b is different from the vehicle-mounted machine 100a according to the first embodiment in that it includes a search instruction/result acquisition unit 106 instead of the communication channel search unit 104. The Smartphone 30b is different from the Smartphone 30a according to the first embodiment in that it includes a communication unit 31, a communication channel search unit 32 and a search result notification unit 33.

When the communication state determination unit 103 determines that the communication state in the communication with the Smartphone 30b is not good, the search instruction/result acquisition unit 106 in the vehicle-mounted machine 100b transmits an instruction to search a communication channel to be switched to the Smartphone 30b. Further, the search instruction/result acquisition unit 106 receives a result of the searching of a communication channel to be switched, which is notified by the search result notification unit 33 in the Smartphone 30b.

The communication unit 31 in the Smartphone 30b makes Wi-Fi communication with the communication unit 101 in the vehicle-mounted machine 100b. The communication unit 31 receives the instruction to search a communication channel to be switched, which is transmitted from the vehicle-mounted machine 100b. The communication unit 31 transmits the result of the searching of a communication channel to be switched to the vehicle-mounted machine 100b.

When the communication unit 31 receives the instruction to search a communication channel to be switched, the communication channel search unit 32 in the Smartphone 30b searches a communication channel to be switched, which is usable for the communication between the vehicle-mounted machine 100b and the Smartphone 30b via the communication with the base station 20 in LTE-LAA communication. The detailed processing of searching a communication channel to be switched by the communication channel search unit 32 is similar to the search processing by the communication channel search unit 104 according to the first embodiment, and thus the description thereof will be omitted.

The search result notification unit 33 in the Smartphone 30b notifies the result of the searching of a communication channel to be switched by the communication channel search unit 32 to the vehicle-mounted machine 100b via the communication unit 31.

[Exemplary Processing by Vehicle-Mounted Machine and Smartphone]

Figure 7:
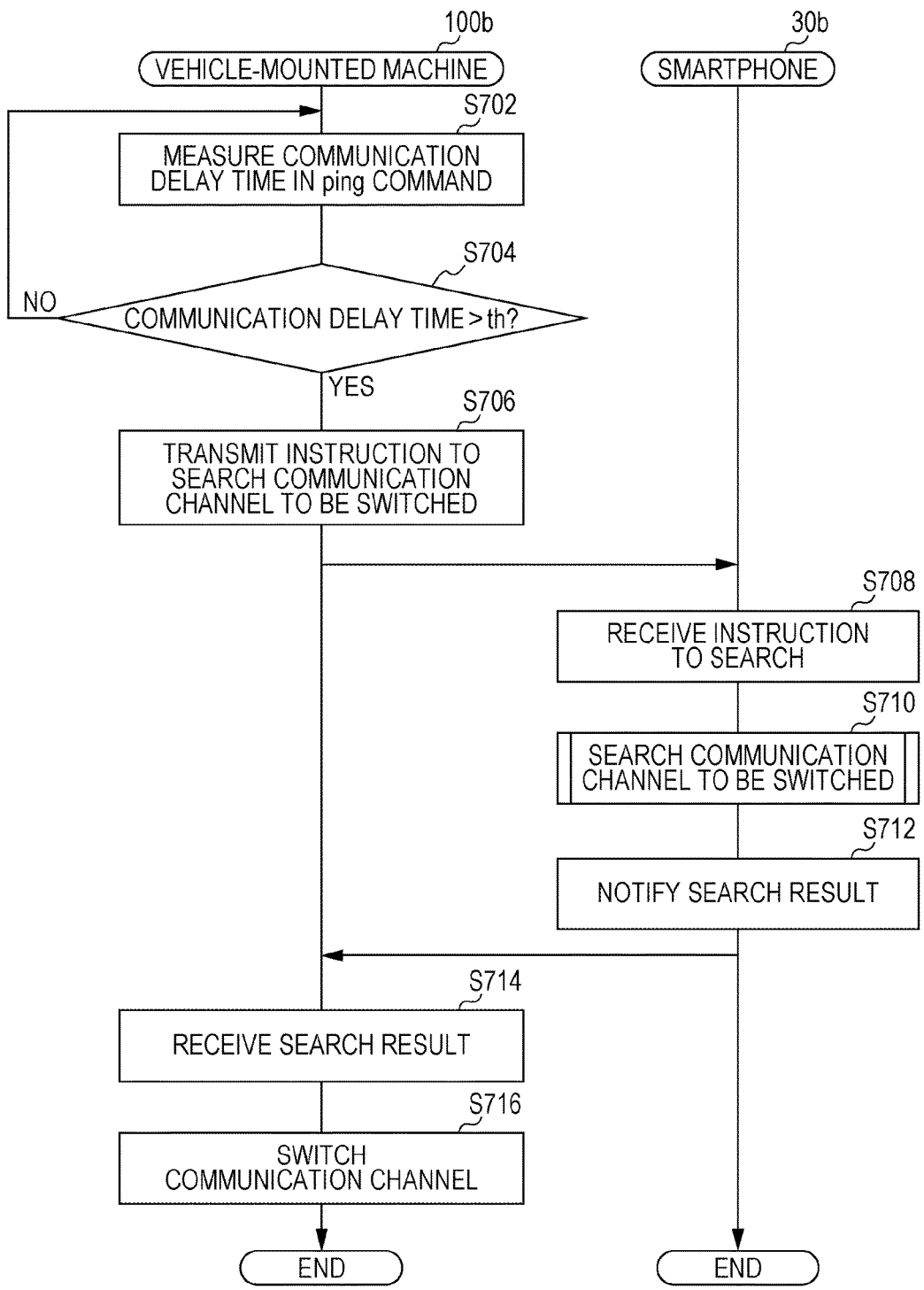
FIG. 7 is a flowchart illustrating exemplary processing by the vehicle-mounted machine and the Smartphone according to the second embodiment of the present invention.

FIG. 7 is a flowchart illustrating exemplary processing by the vehicle-mounted machine 100b and the Smartphone 30b according to the second embodiment of the present invention. The processing illustrated in FIG. 7 is repeatedly performed while Wi-Fi communication is being made between the communication unit 101 in the vehicle-mounted machine 100b and the communication unit 31 in the Smartphone 30b, for example.

At first, the communication delay measurement unit 102 in the vehicle-mounted machine 100b transmits a ping command to the Smartphone 30b thereby to measure a communication delay time in the Wi-Fi communication with the Smartphone 30b (step S702). The communication state determination unit 103 then determines whether the communication delay time measured in step S702 exceeds the predetermined threshold th (step S704).

When the communication state determination unit 103 determines that the communication delay time does not exceed the predetermined threshold th (Step S704: No), the vehicle-mounted machine 100b performs the processing in and subsequent to step S702 again.

On the other hand, when the communication state determination unit 103 determines that the communication delay time exceeds the predetermined threshold th (step S704: Yes), the search instruction/result acquisition unit 106 transmits an instruction to search a communication channel to be switched to the Smartphone 30b (step S706).

When the communication unit 31 in the Smartphone 30b receives the instruction to search transmitted in step S706 (step S708), the communication channel search unit 32 searches a communication channel to be switched, which is usable for the communication between the vehicle-mounted machine 100b and the Smartphone 30b, via the communication with the base station 20 in LTE-LAA communication (step S710). Step S710 is similar to that in the first embodiment (FIG. 3 and FIG. 5), and thus the detailed description thereof will be omitted. The search result notification unit 33 then notifies a result of the searching of a communication channels to be switched in step S710 to the vehicle-mounted machine 100b via the communication unit 31 (step S712).

The search instruction/result acquisition unit 106 in the vehicle-mounted machine 100b then receives the result of the searching of a communication channel to be switched, which is notified in step S712 (step S714). The communication switching unit 105 further switches the communication channel used for the communication between the communication unit 101 and the Smartphone 30b from the communication channel in current use to the communication channel to be switched, which is specified by the search result received in step S714 (step S716). The vehicle-mounted machine 100b and the Smartphone 30b then terminate the processing illustrated in FIG. 7.

As described above according to the second embodiment of the present invention, the Smartphone 30b may search a communication channel to be switched via the base station 20. Also in this case, a communication channel to be switched can be searched while the Wi-Fi communication between the vehicle-mounted machine 100b and the Smartphone 30b is being kept as in the first embodiment. Thus, according to the second embodiment of the present invention, when a deterioration in performance is caused due to radiowave interference during communication in one communication channel, another communication channel to be switched can be searched without interrupting the communication. In particular, according to the second embodiment of the present invention, even when the vehicle-mounted machine 100b does not have a function of searching a communication channel to be switched in LTE-LAA communication, the search function can be realized in the Smartphone 30b.

Third Embodiment

A third embodiment of the present invention will be described below with reference to FIG. 8. In the following description, only the differences from the first embodiment will be described, and other points are similar to those in the first embodiment, and thus the description thereof will be omitted.

Figure 8:
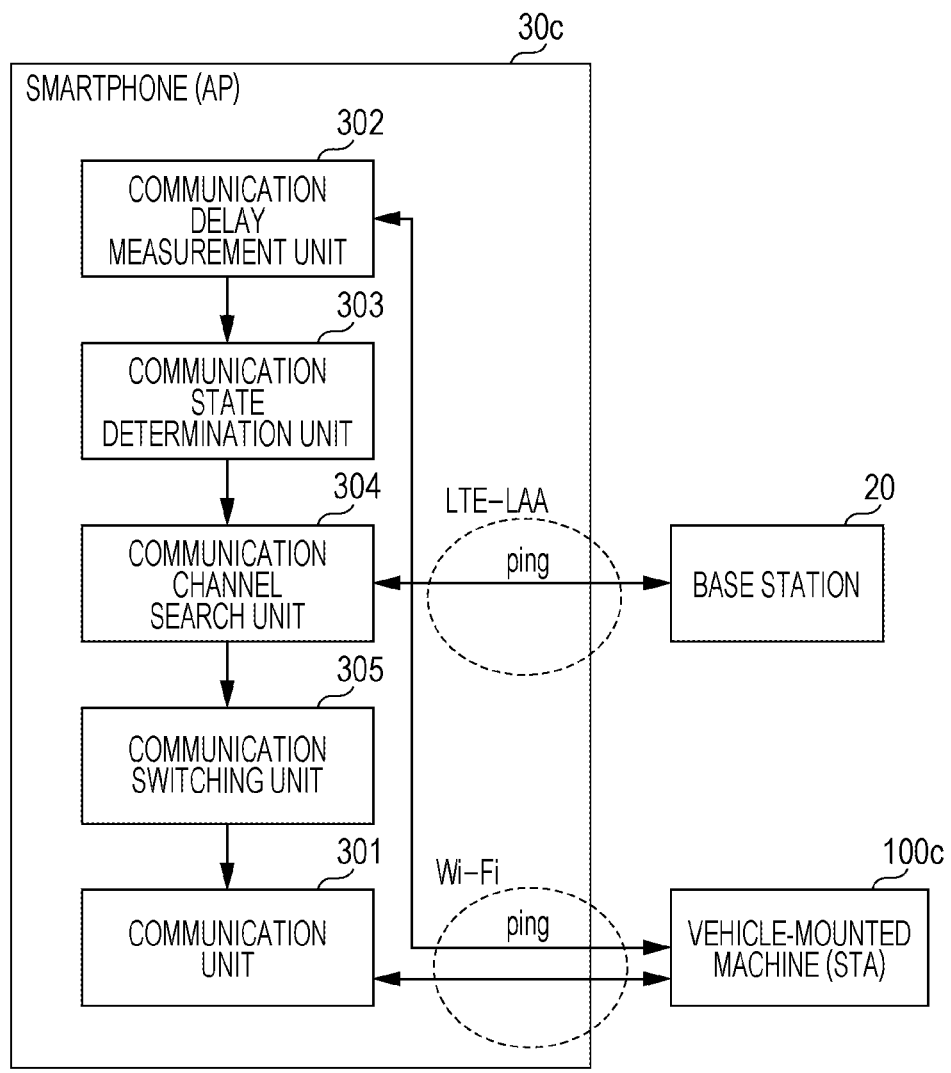
FIG. 8 is a block diagram illustrating an exemplary functional configuration of a Smartphone according to a third embodiment of the present invention.

FIG. 8 is a block diagram illustrating an exemplary functional configuration of a Smartphone 30c according to the third embodiment of the present invention. A communication system 10c according to the third embodiment illustrated in FIG. 8 is different from the communication system 10a according to the first embodiment (the vehicle-mounted machine 100a functions as AP and the Smartphone 30a functions as STA) in that the Smartphone 30c functions as AP and a vehicle-mounted machine 100c functions as STA.

The Smartphone 30c is accordingly provided with a communication unit 301, a communication delay measurement unit 302, a communication state determination unit 303, a communication channel search unit 304, and a communication switching unit 305. The function units 301 to 305 have functions similar to the function units 101 to 105 provided in the vehicle-mounted machine 100a according to the first embodiment, respectively.

That is, according to the third embodiment, the Smartphone 30c operates similarly to the vehicle-mounted machine 100a according to the first embodiment. The vehicle-mounted machine 100c operates similarly to the Smartphone 30a in the first embodiment. Thus, the communication system 10c according to the third embodiment operates similarly to the communication system 10a according to the first embodiment, and can produce effects similar to those of the communication system 10a according to the first embodiment.

Fourth Embodiment

A fourth embodiment of the present invention will be described below with reference to FIG. 9. In the following description, only the differences from the second embodiment will be described, and other points are similar to those in the second embodiment, and thus the description thereof will be omitted.

Figure 9:
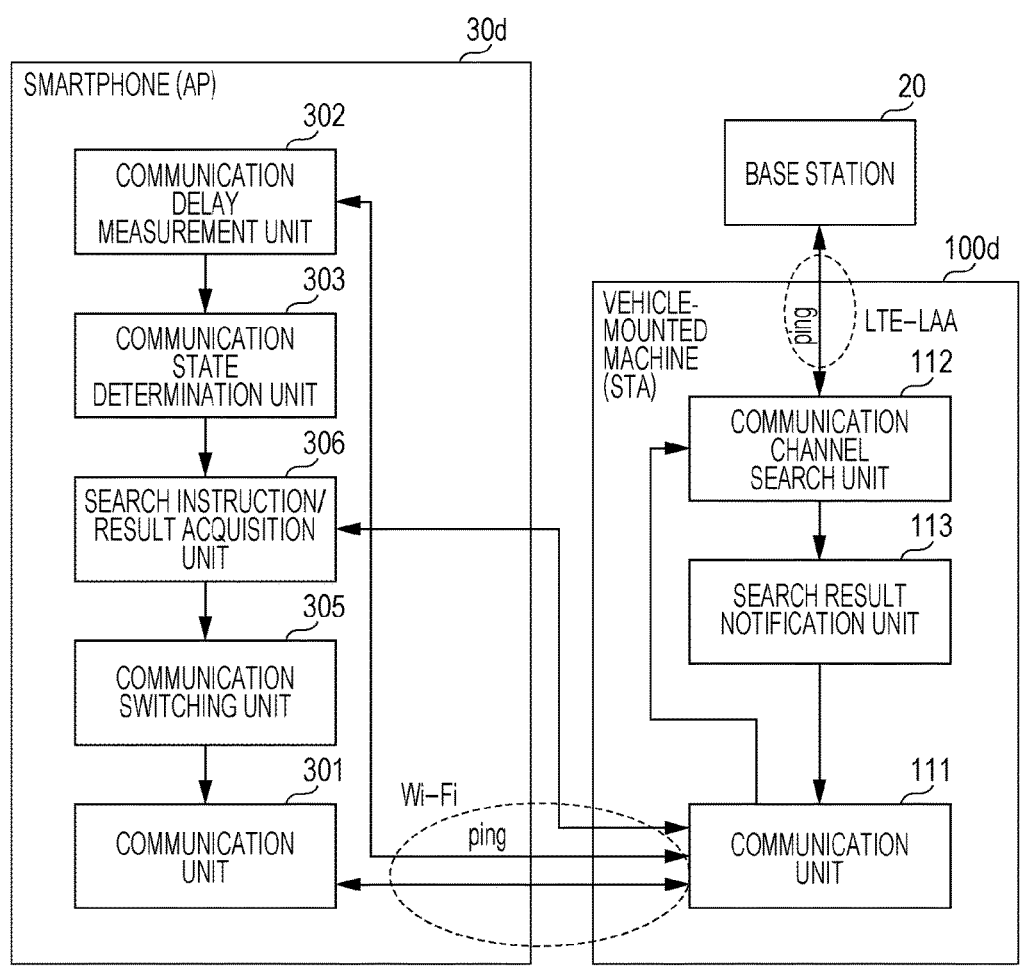
FIG. 9 is a block diagram illustrating exemplary functional configurations of a vehicle-mounted machine and a Smartphone according to a fourth embodiment.

FIG. 9 is a block diagram illustrating exemplary functional configurations of a vehicle-mounted machine 100d and a Smartphone 30d according to the fourth embodiment of the present invention. A communication system 10d according to the fourth embodiment illustrated in FIG. 9 is different from the communication system 10b according to the second embodiment (the vehicle-mounted machine 100b functions as AP and the Smartphone 30b functions as STA) in that the Smartphone 30d functions as AP and the vehicle-mounted machine 100d functions as STA.

The Smartphone 30d is accordingly provided with the communication unit 301, the communication delay measurement unit 302, the communication state determination unit 303, the communication switching unit 305, and a search instruction/result acquisition unit 306. The function units 301 to 303, 305, and 306 have functions similar to the function units 101 to 103, 105, and 106 provided in the vehicle-mounted machine 100b according to the second embodiment, respectively.

The vehicle-mounted machine 100d is provided with a communication unit 111, a communication channel search unit 112, and a search result notification unit 113. The function units 111 to 113 have functions similar to the function units 31 to 33 provided in the Smartphone 30b according to the second embodiment, respectively.

That is, according to the fourth embodiment, the Smartphone 30d operates similarly to the vehicle-mounted machine 100b in the second embodiment. Further, the vehicle-mounted machine 100d operates similarly to the Smartphone 30b in the second embodiment. Thus, the communication system 10d according to the fourth embodiment operates similarly to the communication system 10b in the second embodiment, and can produce effects similar to those of the communication system 10b in the second embodiment.

According to each embodiment, a communication state of Wi-Fi communication is determined on the basis of a communication delay time measured by a ping command, but the present invention is not limited thereto. For example, a communication state of Wi-Fi communication may be determined on the basis of another index (such as throughput measurement value or RSSI measurement value).

According to each embodiment, a communication channel to be switched is determined on the basis of a communication delay time measured by a ping command in LTE-LAA communication, but the present invention is not limited thereto. For example, a communication channel to be switched may be determined on the basis of another index (such as throughput measurement value or RSSI measurement value).

According to each embodiment, a vehicle-mounted machine (the first and second embodiments) or a Smartphone (the third and fourth embodiments) is employed as an exemplary first communication apparatus, but the present invention is not limited thereto. According to each embodiment, a Smartphone (the first and second embodiment) or a vehicle-mounted machine (the third and fourth embodiments) is employed as an exemplary second communication apparatus, but the present invention is not limited thereto. That is, the first communication apparatus and the second communication apparatus may employ any communication apparatuses capable of mutually making wireless communication. For example, the first communication apparatus and the second communication apparatus may be any vehicle-mounted communication apparatuses or other communication apparatuses. The first communication apparatus and the second communication apparatus may be any communication apparatuses (such as personal computer) mounted at a specific position in a fixed manner, or may be any portable communication apparatuses (such as Smartphone, tablet terminal, and cell phone).

According to each embodiment, Wi-Fi communication is used as exemplary first communication system, but the present invention is not limited thereto. According to each embodiment, LTE-LAA communication is employed as exemplary second communication system, but the present invention is not limited thereto. If the second communication system can confirm each communication state of a plurality of communication channels usable for the first communication system, any combination of the first communication system and the second communication system may be employed.

According to each embodiment (the search processing illustrated in FIG. 3), a communication channel for which the communication delay time is shorter than the threshold th2 and the communication delay time is the shortest among a plurality of communication channels is determined as a communication channel to be switched, but a communication channel with the shortest communication delay time may be determined as a communication channel to be switched without the set threshold th2.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A communication apparatus capable of making communication in a first communication system and a second communication system that is different than the first communication system, comprising:
    a communication unit in the first communication system for making communication with a second communication apparatus by use of any one communication channel among a plurality of communication channels in the first communication system;
    a communication state determination unit for determining whether a communication state in the communication with the second communication apparatus is good by determining whether communication performance of the used communication channel in the first communication system has deteriorated beyond a predetermined threshold;

a communication channel search unit for searching a communication channel in the first communication system to be switched, which is usable for the communication with the second communication apparatus, via communication with a base station in the second communication system when the communication state determination unit determines that the communication state in the communication with the second communication apparatus is not good, where the search via the second communication system for a communication channel to be switched is conducted without stopping use of the used communication channel in the first communication system; and a communication switching unit for switching the communication channel used for the communication with the second communication apparatus from the communication channel to the communication channel to be switched, which is searched via the second communication system by the communication channel search unit.

2. The communication apparatus according to claim 1, wherein the communication channel search unit measures a communication delay time of each of a plurality of communication channels usable for the communication with the second communication apparatus, and determines a communication channel for which the measured communication delay time is the shortest among the communication channels as the communication channel to be switched.

3. The communication apparatus according to claim 1, wherein the communication channel search unit measures a communication delay time of a communication channel in use between the communication unit and the second communication apparatus, and determines a communication channel for which the measured communication delay time is shorter than a threshold among the communication channels as the communication channel to be switched assuming the measured communication delay time as the threshold.

4. The communication apparatus according to claim 3, wherein when a communication channel for which the measured communication delay time is shorter than the threshold is first found among the communication channels, the communication channel search unit determines the communication channels as the communication channel to be switched.

5. The communication apparatus according to claim 3, wherein the communication channel search unit determines a communication channel for which the measured communication delay time is shorter than the threshold and the measured communication delay time is the shortest among the communication channels as the communication channel to be switched.

6. The communication apparatus according to claim 1, further comprising:

a communication delay measurement unit for measuring a communication delay time in the communication with the second communication apparatus by a ping command, wherein the communication state determination unit determines whether a communication state in the communication with the second communication apparatus is good on the basis of the communication delay time measured by the communication delay measurement unit.

7. The communication apparatus according to claim 1, wherein the first communication system is Wi-Fi and the second communication system is LTE-LAA.

8. A communication control method by a first communication apparatus, comprising:

a communication step in which a communication unit in the first communication apparatus makes communication with a second communication apparatus by use of any one communication channel among a plurality of communication channels in a first communication system;

a communication state determination step in which a communication state determination unit in the first communication apparatus determines whether a communication state in the communication with the second communication apparatus is good by determining whether communication performance of the used communication channel in the first communication system has deteriorated beyond a predetermined threshold;

a communication channel search step in which when the communication state determination unit determines that the communication state in the communication with the second communication apparatus is not good, a communication channel search unit in the first communication apparatus searches a communication channel in the first communication system to be switched, which is usable for the communication with the second communication apparatus, via communication with a base station in a second communication system that is different than the first communication system, where the search via the second communication system for a communication channel to be switched is conducted without stopping use of the used communication channel in the first communication system; and a communication switching step in which a communication switching unit in the first communication apparatus switches the communication channel used for the communication with the second communication apparatus from the used communication channel to the communication channel to be switched, which is searched via the second communication system by the communication channel search unit.

9. The communication control method according to claim 8, wherein the communication channel search unit measures a communication delay time of each of a plurality of communication channels usable for the communication with the second communication apparatus, and determines a communication channel for which the measured communication delay time is the shortest among the communication channels as the communication channel to be switched.

10. The communication control method according to claim 8, wherein the communication channel search unit measures a communication delay time of a communication channel in use between the communication unit and the second communication apparatus, and determines a communication channel for which the measured communication delay time is shorter than a threshold among the communication channels as the communication channel to be switched assuming the measured communication delay time as the threshold.

11. The communication control method according to claim 10,
wherein when a communication channel for which the measured communication delay time is shorter than the threshold is first found among the communication channels, the communication channel search unit determines the communication channels as the communication channel to be switched.

12. The communication control method according to claim 10,
wherein the communication channel search unit determines a communication channel for which the measured communication delay time is shorter than the threshold and the measured communication delay time is the shortest among the communication channels as the communication channel to be switched.

13. The communication control method according to claim 8, further comprising:
a measuring step in which a communication delay measurement unit measures a communication delay time in the communication with the second communication apparatus by a ping command,
wherein the communication state determination unit determines whether a communication state in the communication with the second communication apparatus is good on the basis of the communication delay time measured by the communication delay measurement unit.

14. The communication control method according to claim 8,
wherein the first communication system is Wi-Fi and the second communication system is LTE-LAA.

15. A communication system comprising a first communication apparatus, a second communication apparatus, and a base station,
wherein the first communication apparatus comprises:
a communication unit for making communication with the second communication apparatus in a first communication system by use of any one communication channel among a plurality of communication channels in the first communication system; and
a communication state determination unit for determining whether a communication state in the communication with the second communication apparatus is good by determining whether communication performance of the used communication channel in the first communication system has deteriorated beyond a predetermined threshold,
the first communication apparatus or the second communication apparatus comprises:
a communication channel search unit for searching a communication channel in the first communication system to be switched, which is usable for the communication with the second communication apparatus, via communication with the base station in a second communication system that is different than the first communication system when the communication state determination unit determines that the communication state in the communication with the second communication apparatus is not good, where the search via the second communication system for a communication channel to be switched is conducted without stopping use of the used communication channel in the first communication system, and
the first communication apparatus further comprises:
a communications switching unit for switching the communication channel used for the communication with the second communication apparatus from the used communication channel to the communication channel to be switched, which is searched via the second communication system by the communication channel search unit.

16. The communication system according to claim 15,
wherein the communication channel search unit measures a communication delay time of each of a plurality of communication channels usable for the communication with the second communication apparatus, and determines a communication channel for which the measured communication delay time is the shortest among the communication channels as the communication channel to be switched.

17. The communication system according to claim 15,
wherein the communication channel search unit measures a communication delay time of a communication channel in use between the communication unit and the second communication apparatus, and determines a communication channel for which the measured communication delay time is shorter than a threshold among the communication channels as the communication channel to be switched assuming the measured communication delay time as the threshold.

18. The communication system according to claim 17,
wherein when a communication channel for which the measured communication delay time is shorter than the threshold is first found among the communication channels, the communication channel search unit determines the communication channels as the communication channel to be switched.

19. The communication system according to claim 17,
wherein the communication channel search unit determines a communication channel for which the measured communication delay time is shorter than the threshold and the measured communication delay time is the shortest among the communication channels as the communication channel to be switched.

20. The communication system according to claim 15, further comprising:
a communication delay measurement unit for measuring a communication delay time in the communication with the second communication apparatus by a ping command,
wherein the communication state determination unit determines whether a communication state in the communication with the second communication apparatus is good on the basis of the communication delay time measured by the communication delay measurement unit.

* * * * *